United States Patent [19]

Blackledge, Jr. et al.

[11] Patent Number: 5,835,738

[45] Date of Patent: Nov. 10, 1998

[54] ADDRESS SPACE ARCHITECTURE FOR MULTIPLE BUS COMPUTER SYSTEMS

[75] Inventors: John Wiley Blackledge, Jr.; Bechara Boury, both of Boca Raton, Fla.; Bradly George Frey, Austin, Tex.; James D. Reid, Boynton Beach; Ronald Valli, Boca Raton, both of Fla.

[73] Assignee: International Business Machines Corporation, Armonk, N.Y.

[21] Appl. No.: 668,530

[22] Filed: Jun. 24, 1996

Related U.S. Application Data

[63] Continuation of Ser. No. 262,724, Jun. 20, 1994, abandoned.

[51] Int. Cl.[6] ............................................. G06F 13/00
[52] U.S. Cl. ........................... 395/307; 395/309; 395/308
[58] Field of Search ................................. 395/307, 308, 395/309

[56] References Cited

U.S. PATENT DOCUMENTS

| | | | |
|---|---|---|---|
| 4,325,118 | 4/1982 | DeVita et al. | 3953/375 |
| 4,802,085 | 1/1989 | Levy et al. | 395/375 |
| 4,845,611 | 7/1989 | Turlakov et al. | 395/250 |
| 5,113,369 | 5/1992 | Kinoshita | 395/325 |
| 5,287,531 | 2/1994 | Rogers, Jr. et al. | 395/800 |
| 5,367,689 | 11/1994 | Mayer et al. | 395/725 |
| 5,379,384 | 1/1995 | Solomon | 395/325 |
| 5,396,602 | 3/1995 | Amini et al. | 395/325 |
| 5,418,930 | 5/1995 | Swarts | 395/500 |
| 5,423,009 | 6/1995 | Zhu | 395/307 |
| 5,440,698 | 8/1995 | Sindhu et al. | 395/200.8 |
| 5,471,632 | 11/1995 | Gavin | 395/307 |
| 5,509,126 | 4/1996 | Oprescu et al. | 395/307 |
| 5,590,378 | 12/1996 | Thayer et al. | 395/307 |

*Primary Examiner*—Jack B. Harvey
*Assistant Examiner*—David A. Wiley
*Attorney, Agent, or Firm*—Anthony N. Magistrale

[57] ABSTRACT

An information processing system comprises a processor, a first bus for conducting signals in accordance with a first bus protocol that does not support I/O address signals; a second bus for conducting signals in accordance with a second bus protocol that supports input/output (I/O) address signals; and a bridge circuit for coupling the first bus to the second bus. The processor includes a circuit for emitting address signals and an address type signal directed to a selected peripheral device. The bridge circuit comprises a filter for determining whether the address signal emitted by the processor corresponds to a peripheral device coupled to a bus subordinate to the bridge circuit; and a translation circuit, coupled to the filter, for translating signals in accordance with the first bus protocol to signals in accordance with the second bus protocol for transmission to the selected peripheral device.

18 Claims, 13 Drawing Sheets

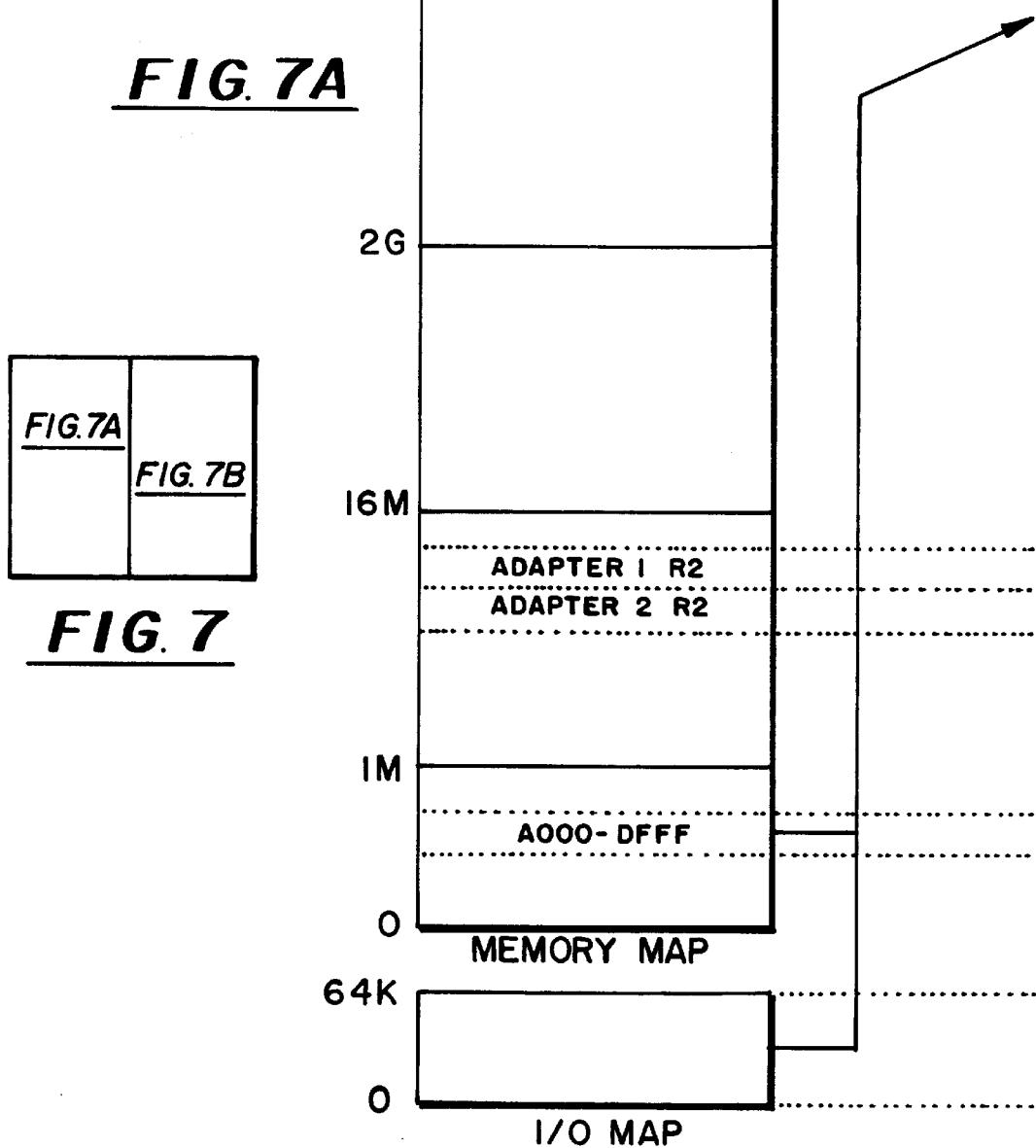

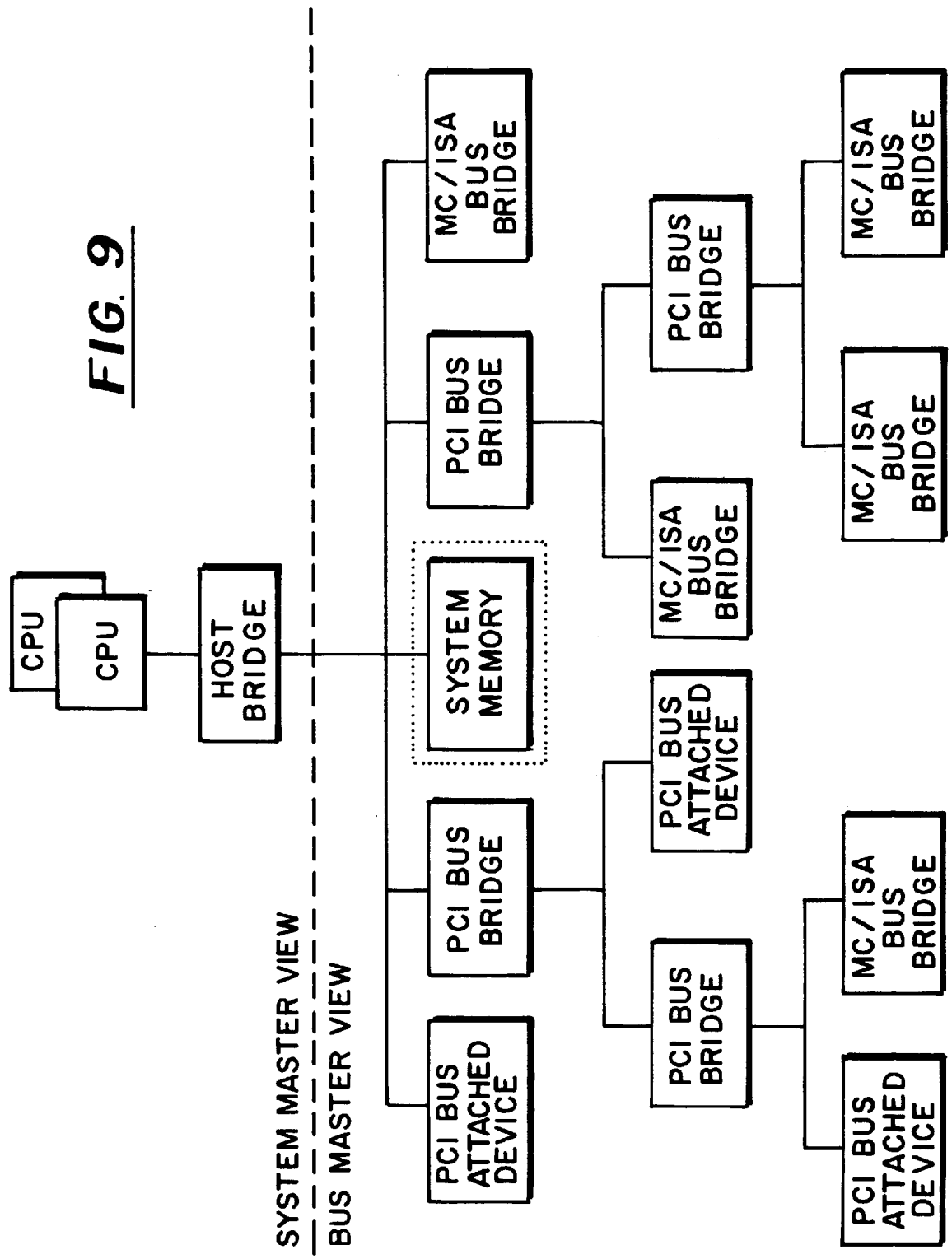

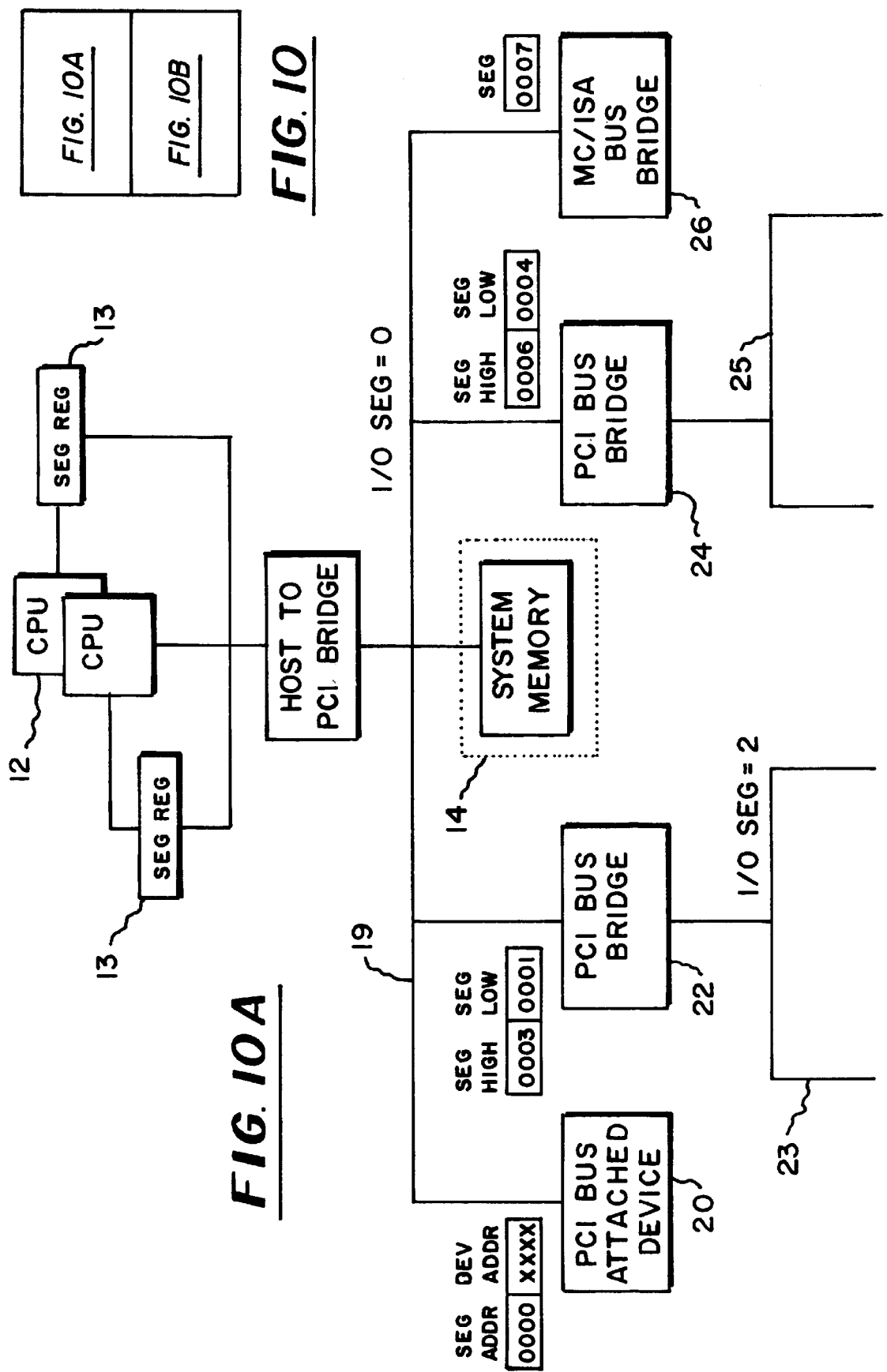

ADDRESS SPACE ARCHITECTURE FOR MULTIPLE BUS COMPUTER SYSTEMS

This is a continuation of application Ser. No. 08/262,724 filed on Jun. 20, 1994, now abandoned.

BACKGROUND OF THE INVENTION

The present invention relates to personal computer systems and more particularly to personal computer systems having multiple bus architectures.

Computer systems typically include more than one bus, each bus in the system having devices attached thereto which communicate locally with each other over the bus. Examples of the different types of buses present in typical computer systems are a system bus to which a host central processing unit is attached and one or more peripheral buses. System-wide communication over different buses is required, however, if a device attached to one bus needs to read or write information to or from a device on another bus. To permit system-wide communication between devices on different buses, bus-to-bus bridges (interfaces) are provided to match the communications protocol of one bus with that of another.

Each bus-to-bus bridge in a multiple-bus computer system is used to connect two buses in the system. Various types of buses are available to construct a given computer system. One such bus which is becoming widely accepted is the PCI (Peripheral Component Interconnect) bus, which is capable of performing significant data transfer in a relatively short period of time. The PCI bus achieves this high level of performance, in part, because it may be directly linked to other high speed buses, such as system buses to which a CPU may be connected, and thus may provide for rapid transfer of data between devices attached to the PCI bus and devices attached to the system bus. In fact, the operation of several high integration devices, such as certain graphics package controllers, require a direct link to a system bus through a high performance bus such as the PCI bus. In addition, the PCI bus architecture does not require any "glue logic" to operate peripheral devices connected to it. Glue logic for other buses typically consists of miscellaneous hardware components such as decoders, buffers or latches that are installed intermediate the peripheral devices and the bus.

The primary PCI bus operates on a synchronous clock signal of 33 MHz, and the strings of data transmitted over the PCI bus are 32 bits wide. A 32-bit data string on the PCI bus is called a double word (DWORD), which is divided into 4 bytes each comprising 8 bits of data. The address and data information carried by the PCI bus are multiplexed onto one signal. Multiplexing eliminates the need for separate address and data lines, which in turn, reduces the amount of signals required in a PCI bus environment as opposed to other bus architectures. The number of signals required in PCI bus architecture is between 45–47 while non-multiplexed buses typically require twice this number. Accordingly, because the number of signals are reduced, the number of connection pins required to support a device linked to the PCI bus is also reduced by a corresponding number. PCI architecture is thus particularly adapted for highly integrated desktop computer systems.

A more detailed description of the structure and operation of PCI bus architecture is provided in "Peripheral Component Interconnect (PCI) Revision 2.0 Specification", published Apr. 30, 1993; "Preliminary PCI System Design Guide", revision 0.6, published Nov. 1, 1992 by the PCI Special Interest Group, the contents of which references are incorporated herein by reference as if they were fully set forth.

To satisfy user requirements for higher reliability and performance (e.g., as in servers) personal computer systems are being built with more and faster processors, faster networks and redundancy. The processors include Intel x86, RISC and other microprocessors. Some of these microprocessors do not support I/O address space. In addition, redundancy requirements have driven system designers to include more expansion slots in multiple expansion channels (for example, IBM Model 295 servers have two Micro Channels). Future products will include multiple buses.

Personal computers and workstations are required to have expansion capability which allows the user to add adapters and devices to the base system after initial installation. To satisfy this requirement, these systems contain expansion buses. The two most common are the Industry Standard Architecture (ISA) bus and the Micro Channel (MC) bus.

As processor and I/O device speeds increased, the industry direction has been to satisfy the demands for high speed I/O functions by implementing local buses. Local buses support higher speed devices by attaching them in close proximity to the processor.

Personal computer systems constructed with the PCI or other local bus supporting multiple Micro Channel buses introduce an environment that may contain multiple instances of the same adapter. Since many adapters have been designed to support only two, three, or four instances of the adapter in a system, addressing conflicts arise when more adapters are installed. There are processor and system architectures which do not provide instructions or signals to support I/O address space. In these systems, I/O devices must be mapped into the system's memory address space. There are two problems to be solved: (1) multiple instances of adapters with address selection limitations; (2) supporting adapters with I/O addresses in systems where processors do not support I/O address space.

New functions and features in personal computers have introduced a need for I/O addresses beyond the 64k supported by the Intel x86 architectures. Moreover, the address space architecture should support:

Processors with and without I/O address space;

Systems with multiple processors;

Systems with hierarchical buses;

Systems with multiple expansion buses (Micro Channel, ISA, or EISA)

Addressability of system memory and non-system (I/O) memory by system master;

Addressability of I/O devices by System masters;

Addressability of system memory and non-system memory by bus masters on any bus;

Addressability of I/O devices by bus masters on any bus; and

Protection of I/O addresses.

To assure proper system operation, it is necessary to define the methods for generating and transmitting addresses throughout the system. These definitions shall impose requirements on the devices used to implement the bus bridges and the software that configures and uses the system.

In today's environment the address space architecture may be required to be compatible with the following architectures: (1) Micro Channel; (2) Industry Standard Architecture (ISA); (3) Peripheral Component Interface (PCI); (5)

Personal System/2; (7) PowerPC; and (8) Personal Computer Memory Card International Association (PCMCIA). There are two types of entities in a system that emit address and control signals to the buses: (1) System master; (2) Bus masters and third party DMA controllers. System masters manage and control the system configuration. The system master is typically the host processor, and there may be more than one processor in the host processor set. Bus masters arbitrate for control of the bus. Bus masters support data transfers with I/O and memory slaves. DMA (direct memory access) controllers do not arbitrate for the bus on behalf of a slave; a DMA slave arbitrates for the bus. DMA controllers support data transfers between DMA slaves and memory and I/O slaves. DMA controllers arbitrate for the bus for memory-to-memory transfers.

Each of these entities has addressing constraints imposed by preexisting architectures that must be accommodated. The system master controls the configuration of all of the system resources and is the only element in the system that has knowledge of the bus topology and the address transmission mechanisms.

The system master addressing constraints include: (1) System memory must be located at physical address 0; (2) Location FFFFFFF0h must contain initialization code; and (3) Processors without I/O instructions and signals must communicate with devices physically mapped in the I/O address space. Memory controllers and operating systems for RISC processors are not typically designed to accommodate 20 and 24 bit memory address range discontinuities. Intel x86 processors emit only 16 bit I/O addresses. Processors in multiprocessor environments have private local system memory. Not all of these constraints apply to all system masters. All system masters in a system must be the same type.

There are several constraints caused by the bus masters and DMA controllers. Bus masters and DMA controllers must emit address and control signals to facilitate the movement of data without intervention from the system master. The target of the address and control signals is either a memory slave or an I/O slave. (Bus masters are not permitted access to Micro Channel or PCI configuration space.) Bus masters may be attached to the PCI bus or to the Micro Channel bus. The following architecture limitations impose constraints on the address space architecture: (1) Micro Channel and ISA architectures support only 16 bit I/O addresses; (2) Micro Channel and ISA adapters can contain I/O functions mapped in the memory address space which are limited to 20 bit and 24 bit addresses. Systems with multiple Micro Channel or ISA expansion buses may be configuration limited by device address range selection capability.

Therefore, there is a need for a computer system that overcomes the constraints discussed above.

SUMMARY OF THE INVENTION

Briefly, in accordance with one aspect of the invention, an information processing system comprises a processor including means for emitting an address signal directed to a selected peripheral device; a first bus for conducting signals in accordance with a first bus protocol; a second bus for conducting signals in accordance with a first bus protocol; and a bridge circuit for coupling the first bus to the second bus. The bridge circuit comprises filter means for determining whether the address signal emitted by the processor corresponds to a peripheral device coupled to a bus subordinate to the bridge circuit; and translation means, coupled to the filter means, for translating signals in accordance with the first bus protocol to signals in accordance with a second bus protocol for transmission to the selected peripheral device.

BRIEF DESCRIPTION OF THE DRAWING(S)

FIG. 9 shows views of the system by the system master and bus master.

DESCRIPTION OF THE ILLUSTRATIVE EMBODIMENT(S)

Personal computer systems may contain a PCI bus as the primary bus with Micro Channel or ISA buses subordinate to the primary PCI bus. The PCI bus structure is hierarchial and PCI buses may also be subordinate to the primary PCI bus.

Figure 1:
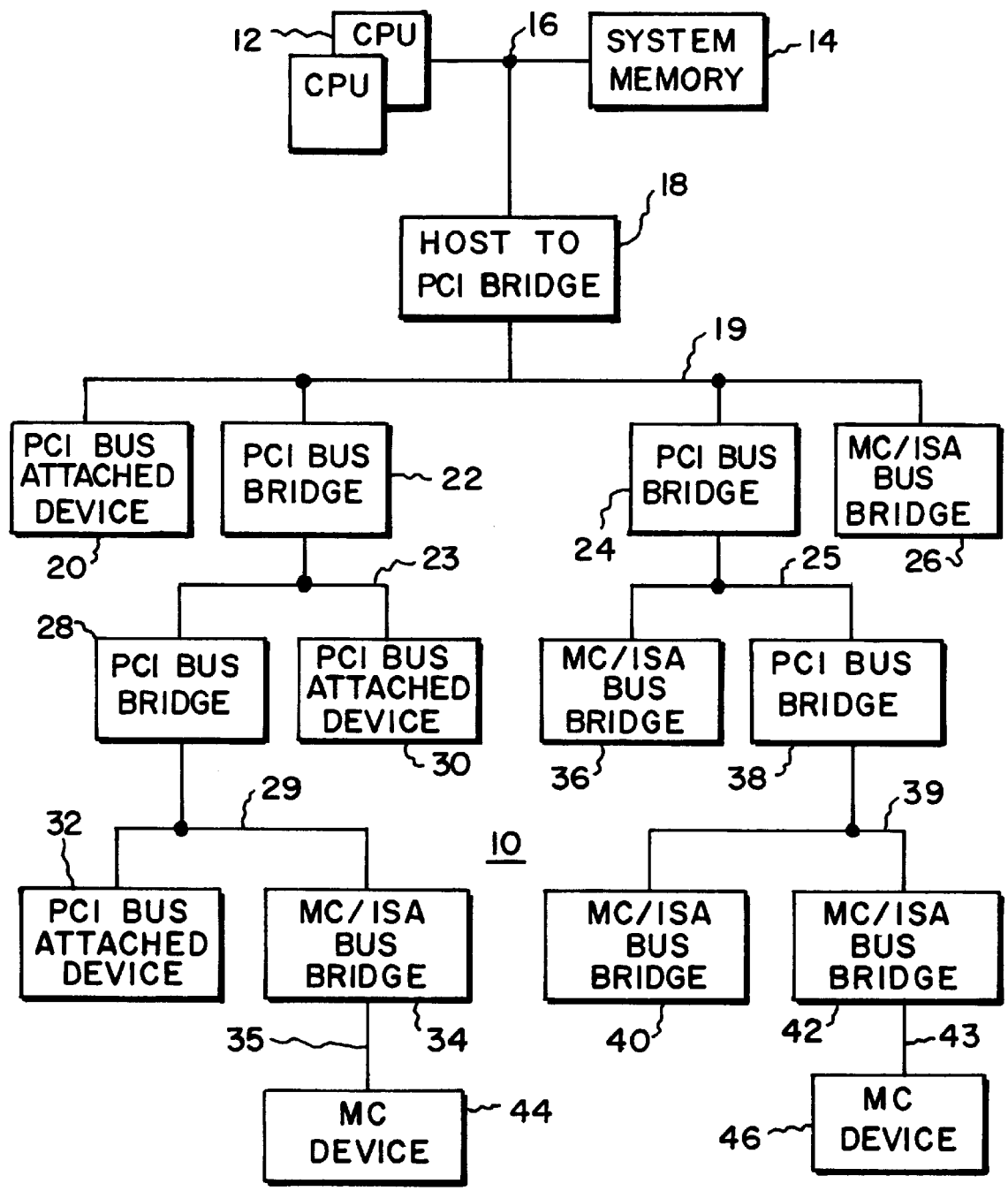
FIG. 1 is a block diagram of a computer system including a hierarchical bus structure in which the present invention may be advantageously used.

Referring to FIG. 1, a simplified block diagram of a computer system 10 is shown. In this system, one or more processor units 12 and a memory 14, both coupled to a host (or primary) bus 16, interface with an I/O bus 19 via a host-to-bus bridge 18. The host bus 16 conducts processor-unique signals. The host-to-bus bridge 18 converts the processor-unique signals of bus 16 to standardized I/O signals for bus 19. In a preferred embodiment, the I/O bus 19 (which is subordinate to the bridge 18) and subordinate buses 23, 25, 29, and 39 are designed in compliance with the PCI standard. However, the invention may be usefully employed in other I/O buses. The primary bus 16 is coupled to other PCI, Micro Channel (MC) or ISA buses via a hierarchical bus structure. The system 10 has the capability of supporting multiple expansion buses. The I/O bus 19 is coupled to a peripheral device 20, PCI bus bridges 22 and 24, and a MC/ISA bridge 26. PCI bus bridge 22 is coupled to another PCI bridge 28 and to a peripheral device 30, via PCI bus 23. The purpose of PCI bus-to-PCI bus bridges is to increase expandability (i.e., scalability). The PCI bridge 28 is coupled to a peripheral device 32 and a MC/ISA bus bridge 34, via bus 29. A Micro Channel device 44 is coupled to the bridge 34 via a Micro Channel bus 35. The PCI bus bridge 24 is coupled to a MC/ISA bridge 36 and to another PCI bus bridge 38 (via PCI bus 25). Bus bridge 38 is, in turn, coupled to a MC/ISA bus bridges 40 and 42, via bus 39. A Micro Channel device 46 (identical to device 44) is coupled to the bridge 42 via a Micro Channel bus 43. Bridges such as bridge 34 must convert the PCI-compliant signals of its primary bus 29 to the standardized signals required in its subordinate bus 35. The bus 35 may be a Micro Channel, ISA, EISA, or other standard bus architecture.

The bus hierarchy is compatible with both the PCI architecture and the Micro Channel architecture. In a preferred embodiment, the processor complex 12 includes one (or more) Power PC microprocessors which emit 32 bit addresses. Thus, in this structure, the processor complex 12 emits a 32-bit memory address to identify an I/O device.

Processor-to-host-bus bridges must be capable of translating memory addresses to I/O addresses on the primary PCI bus if the bridge is to be used in a RISC based system.

The address emitted must be properly directed through the bus structure to the correct destination, either an I/O device or a memory location. To meet the timing demands of the bus architectures, the bridge devices must be able to identify addresses of memory and I/O devices that are subordinate to (i.e., below) the their bus. The bridge must recognize the address and respond on the bus with the Device Select signals indicating that the address has been accepted and a device will respond.

In systems without I/O signals, a bridge must have the ability to accept a memory address and transfer the address to the subordinate bus as an I/O address. It may also be required to translate the memory address to a different value to correctly identify the selected I/O device. In accordance with the invention several translation functions can be performed to provide an I/O signal recognizable by the selected I/O device. A memory controller/host-to-bus bridge must accept address and memory/IO signals from the processor and perform the following functions: (1) Address range filtering and routing; (2) Address translate.

Thus, PCI to PCI bridges (such as bridges 22 and 24) must provide address range filtering for both memory and I/C) addresses. I/O address segments may be filtered using the address filter mechanism. Expansion bus bridges must accept address and memory/IO signals (or commands) from the input bus and perform the following functions: (1) Address range filtering; and (2) Address translation.

Figure 2:
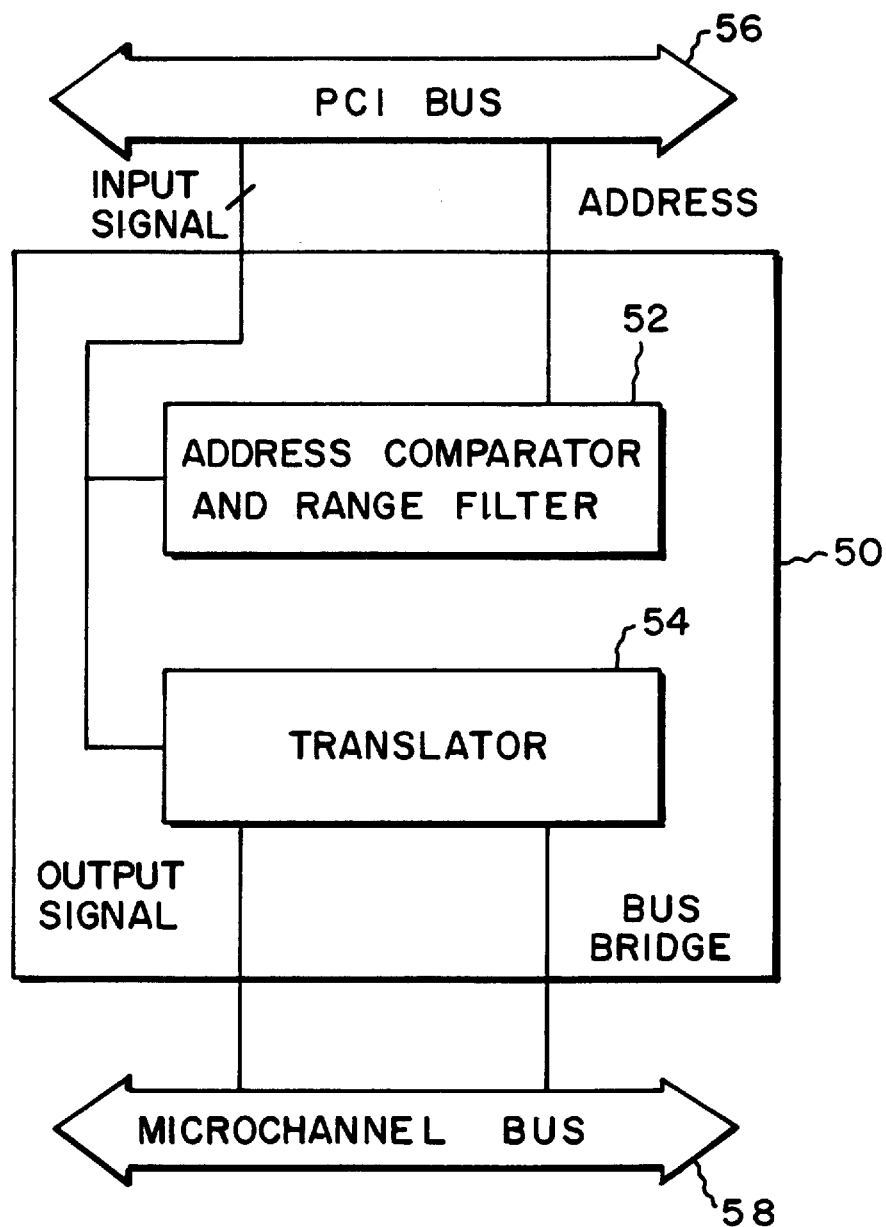
FIG. 2 shows a bus-to-bus bridge address filter/translation component in accordance with one aspect of the invention.

Referring to FIG. 2, a simplified block diagram of the content of a an expansion bus bridge 50 is shown. The bridge 50 couples a PCI bus 56 to a Micro Channel (or other standard I/O bus architecture) bus 58, and includes an address comparator/range filter 52 and a translator 54. The address comparator/range filter 52 monitors the address lines of the bus 56 to detect an address range for the subordinate devices of the bridge 50. The address comparator/range filter 52 filters out addresses not corresponding to the subordinate devices. The translator performs the required translation from the PCI-specific signals of bus 56 into an I/O signal recognizable by the selected I/O device (this would include the M/IO signal indicating that the address is an I/O address).

Expansion bus bridges must be capable of examining an input address range and an input signal to determine if the address belongs to a device on the expansion bus. The expansion bus bridge 50 must maintain the protocol for transactions with addresses that are forwarded to devices on the expansion bus. For the PCI bus, the expansion bus bridge must activate the Device Select signal for all addresses within the ranges specified in the address range registers. The address range filtering mechanism 54 supports the I/O segment check required for segmented 4GB I/O address ranges.

The address translate functions include: mapping a range of the input addresses to an output range and changing a range of input addresses from one type to another (i.e. memory to I/O or I/O to memory). The expansion bus bridge must contain an address translate function that can translate input memory or I/O addresses within a range to an output address that is compatible with the devices on the expansion bus.

The expansion bus bridge translate function converts one address range to another and converts one signal type to another (memory to I/O, I/O to memory). PCI to Micro Channel bridges and PCI to ISA bridges are required to convert 32 bits input addresses to 16 bits addresses for I/O addresses emitted to the expansion bus. The input address may be a 32 bit I/O or memory address, the output required may be a 16 bit I/O address. In addition to the address translate, the output signal may be translated from a Memory or I/O to an I/O or Memory signal.

Figure 3:
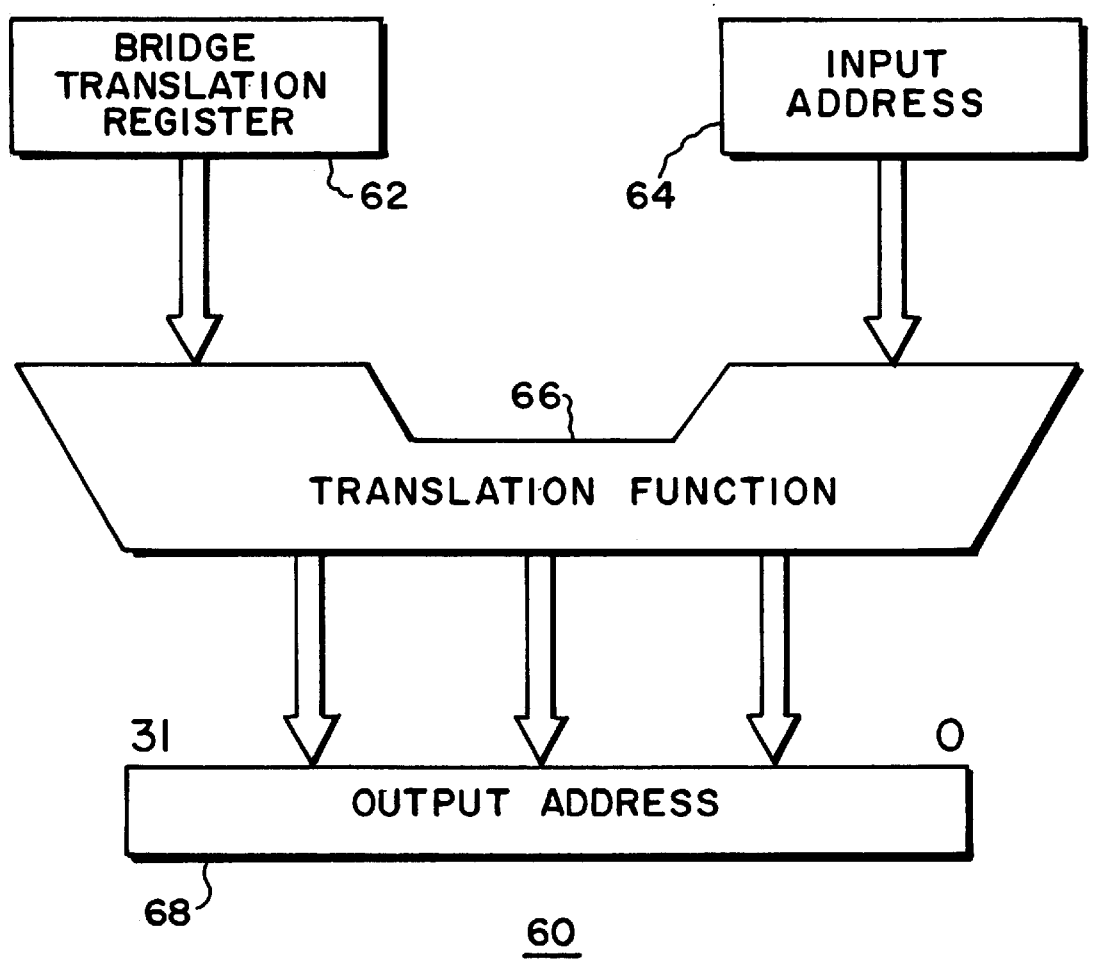
FIG. 3 shows an adder address translation apparatus in accordance with the invention.

Referring to FIG. 3, there is shown a translation apparatus 60 in accordance with the invention. The translation performed by translator 54 can be accomplished in at least three ways. The three ways discussed herein are: (1) addition; (2) exclusive OR; and (3) stripping. In the first case stated above, the translation function is an adder. Thus, the n-bit wide register 62 contained within the address filter register set contains the high n bits of a value to be added to the input address to produce the output address. Thus, in the example of FIG. 3, a 32-bit adder 66 adds the contents of bridge translation register 62 to the input address 64 to produce an output address 68. The addition operation is unsigned and the overflow is discarded. This allows an input address to be translated to an output address anywhere in the address range. Referring back to FIG. 1, assume that the processor 12 outputs an address signal corresponding to Micro Channel device 44 and that the I/O address of device 44 is 3F7h (i.e., device 44 responds to 3F7h). Each bridge (18, 22, 28 and 34) must determine that the address signal is addressed to a device attached to one of its subordinate buses. The bridge 34 must also translate the address on bus 29 to 3F7h. This can be done with the adder 60 of FIG. 3 as follows. The address (i.e., input address 64) to be output by CPU 12 corresponding to the selected device 44 is selected by determining which input address 64 when added to the value in register 62 results in the output address 3F7h. That input address value is then inserted into the memory map of CPU 12.

Figure 7B:
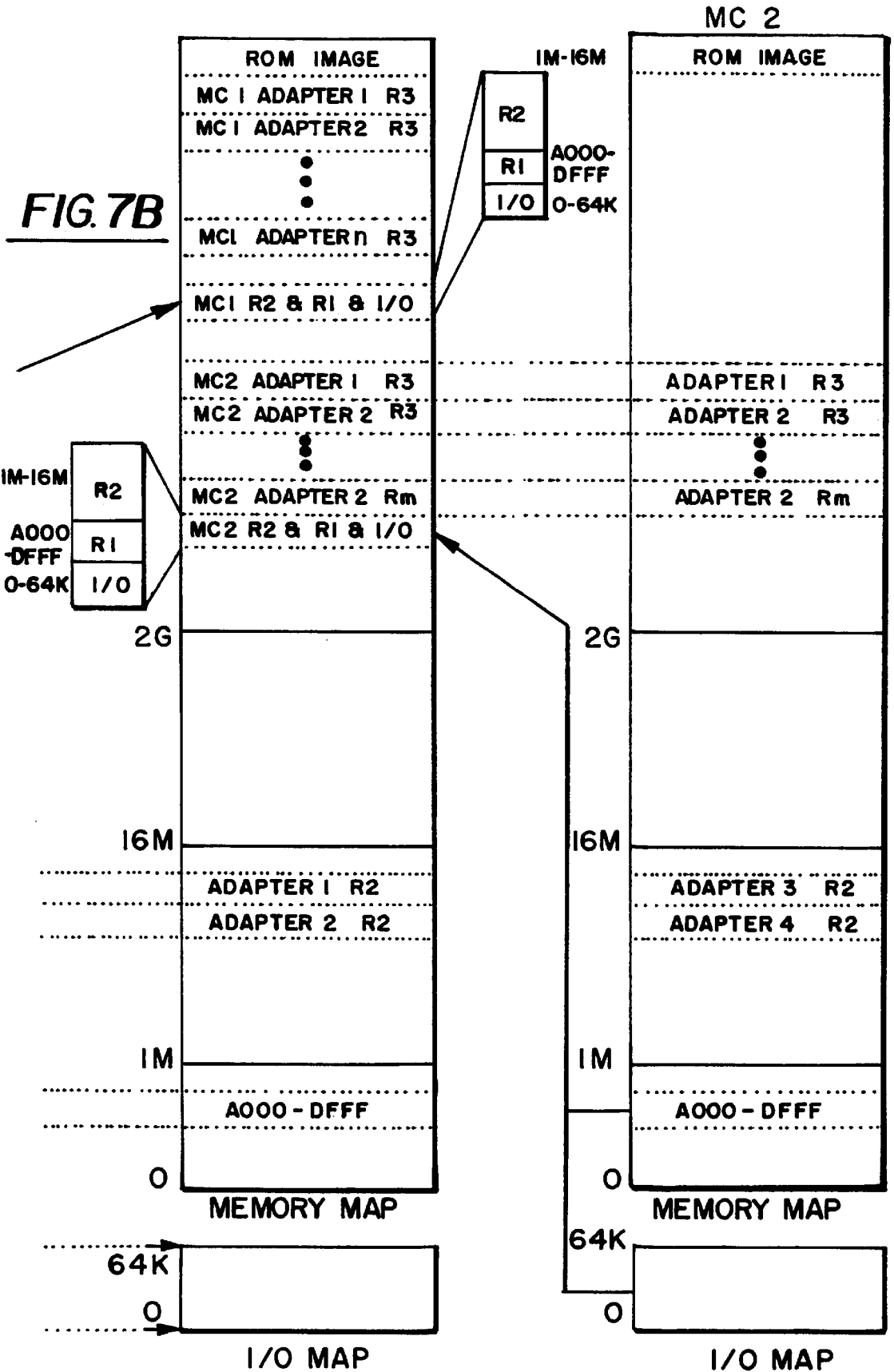
FIG. 7 shows multiple buses mapped into memory and I/O address space.

Referring to FIG. 7, the center memory map represents the view of the processor 12 of the addresses for the I/O devices. The CPU 12 emits a 32-bit address capable of distinguishing among adapters having the same I/O address but attached to different buses. Thus, for example, if adapter device 44 was mapped by configuration software at memory address 200003F7h, the CPU would emit that address for selecting the device 44. However, the device 44 is expecting an I/O address 3F7h. As the CPU output goes through the bus bridges it is translated to address 3F7h because the adapter 44 expects to see I/O address 3F7h.

A second translation approach is to substitute an exclusive OR function for the translation function block 66 shown in FIG. 3. An n-bit wide register contains the high n bits of a value to be exclusive ORed with the input address to produce the output address. The resulting address is output to the subordinate bus with the appropriate control signal.

A third translation operation would be to perform a stripping function with the block 66. The stripping translation removes the high order n bits from the address bus prior to the bus bridge propagating the address to the subordinate bus.

ADDRESS SPACE REFERENCE MODELS

Figure 4:
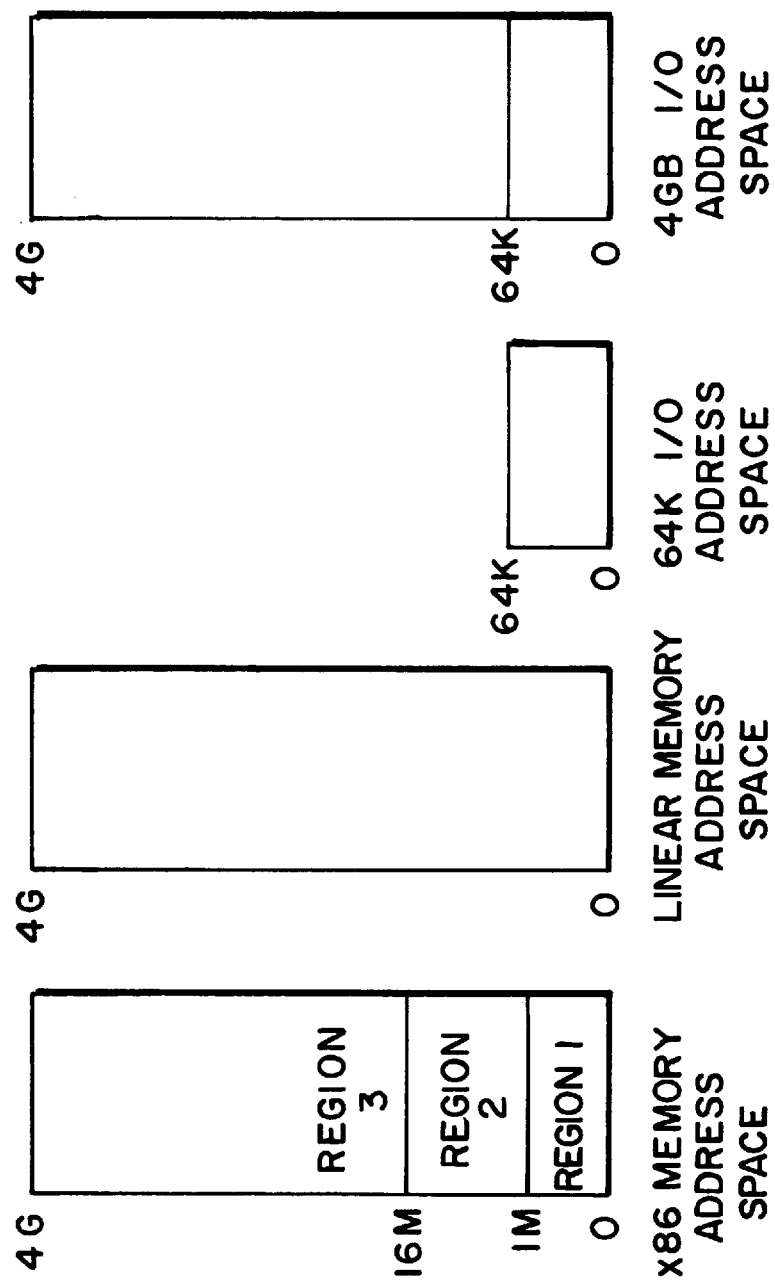
FIG. 4 shows memory and I/O address spaces.

Referring to FIG. 4, an address space architecture in accordance with one aspect of the invention would accommodate the following address spaces:

(1) Intel x86 4GB three-region memory address space;
(2) Linear 4GB memory address space (no I/O space);
(3) Intel x86 64K I/O address space; and
(4) PCI 4GB I/O address space.

These address spaces are accommodated in four models of the address space architecture:

(1) Model 1: 4GB memory address space with 64K I/O address space;
(2) Model 2: 4GB memory address space with a single 64K I/O address space for multiple buses;
(3) Model 3: A single 4GB address space containing both memory and I/O addresses; and
(4) Model 4: 4GB memory address space with 4GB I/O address space.

Model 1: 4GB Memory Address Space, 64K I/O Address Space

In this model, a single 64K I/O address space is available, in addition to the memory address space. The 4GB memory address space is separated into 3 regions to maintain compatibility with systems that used early Intel x86 microprocessors. These regions are:

(1) Region 1—0 to 1 MB;
(2) Region 2—1 MB to 16 MB; and
(3) Region 3—16 MB to 4GB.

Figure 5:
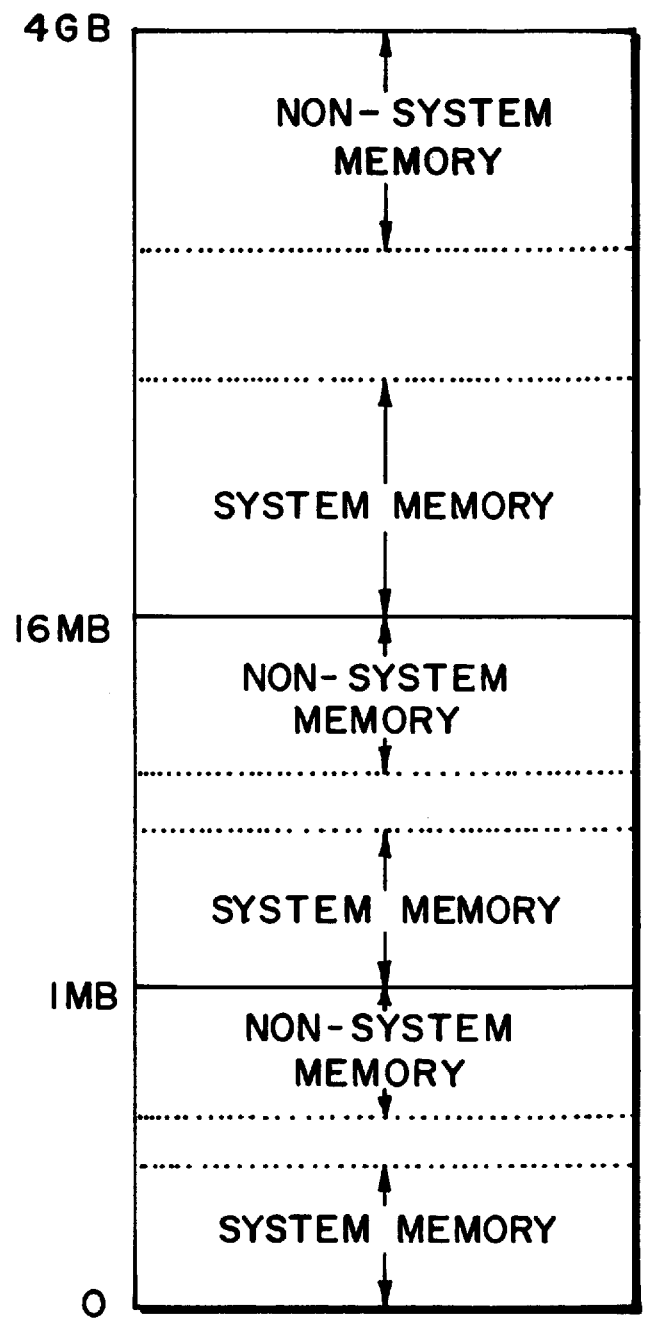
FIG. 5 shows the three regions of memory in an Intel x86 system.

The Intel x86 memory map is illustrated in FIG. 5. When system memory is present in a region, it starts at the beginning of the address range. System memory is always contiguous within a memory region. If non-system memory is present, it is allocated from the highest addresses of the address range to lower addresses. Non-system memory within a region is not required to be contiguous.

Model 2: 4GB Memory Address Space, Single 64K I/O Space, Multiple Buses

Figure 6:
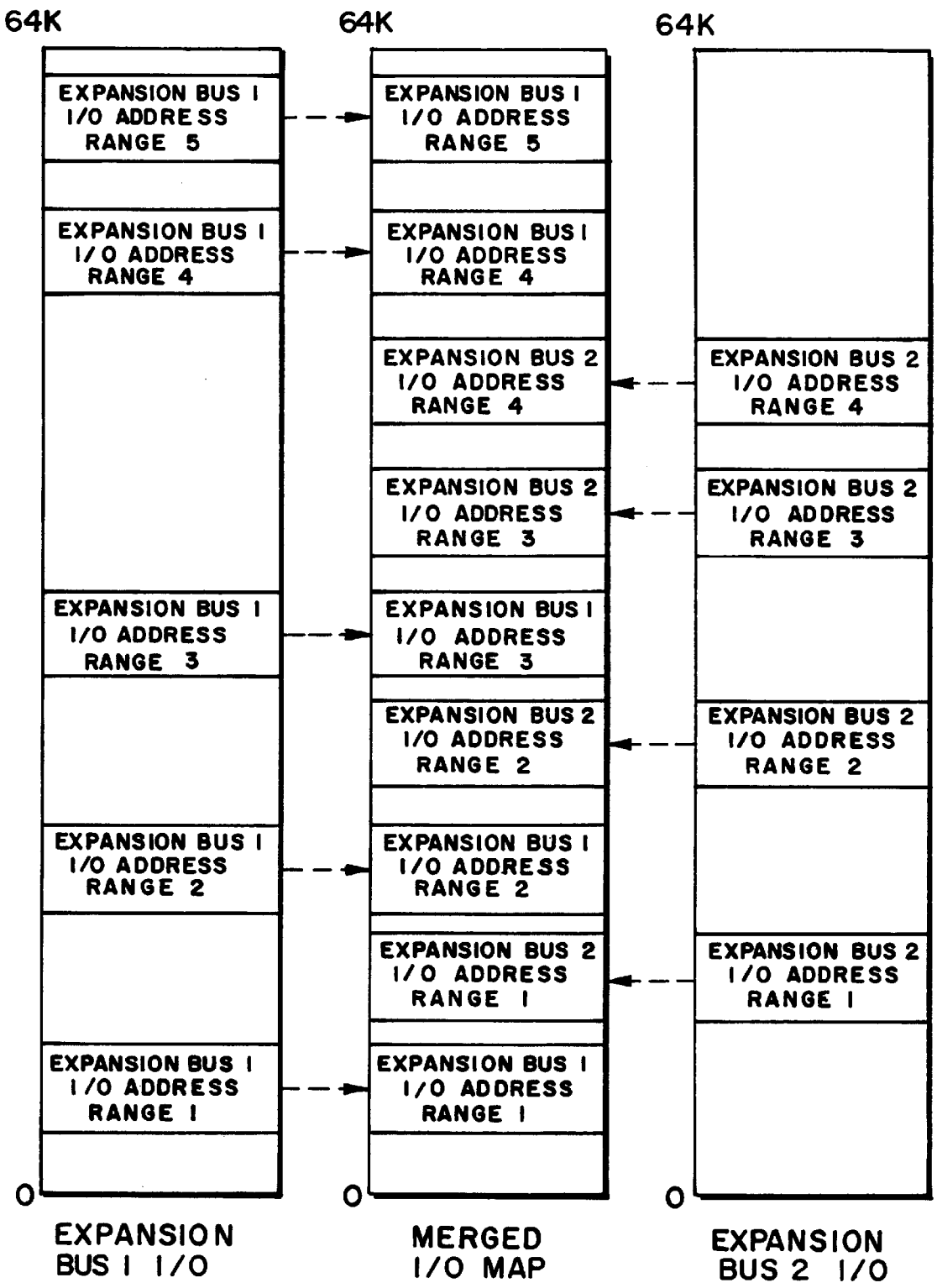
FIG. 6 shows merged I/O map spaces.

This address space model is the same as the model described in, Model 1 (4GB Memory Address Space, 64K I/O Address Space). In addition to a single expansion bus, this model supports multiple expansion buses (as shown in FIG. 1). Multiple Micro Channel expansion buses may be configured to share a single 64K I/O address space. The bus bridges determine which I/O commands are directed to devices on their bus. Type 1 variable data fields are used to identify the address ranges that the bridge must pass through to attached adapters. FIG. 6 illustrates the merging of two expansion bus I/O address spaces. The invention does not limit the number of expansion buses that may be merged into a single I/O space. The limitations are imposed by physical and electrical characteristics of the systems.

Model 3: 4GB Address Space Containing Memory and I/O

In systems with processor complexes that have only a memory address space (as that discussed in reference to FIG. 1), I/O addressed devices must be mapped into a subset of the memory address space. The single address space model may also be used to avoid I/O address conflicts or expand the number of I/O addresses beyond the 64K limit.

As discussed above, mapping I/O addresses into the memory address space requires that the host-to-bus bridge recognize the memory address range that the I/O is mapped into and emit an I/O output signal to the bus for I/O devices attached to the primary PCI bus 19. It may also be necessary to translate the memory address to a different value before the bus bridge emits an I/O address to the selected device. I/O addresses are limited to 16 bit addresses only on expansion buses that are limited to 16 bit addresses.

Referring to FIG. 7, two MC buses mapped into memory and I/O address space are shown. FIG. 7 illustrates a system with two Micro Channels (MC1 and MC2) with the I/O and regions 1 and 2 non-system memory mapped into memory address space above 16 M. The memory map shown in the center of the figure represents the CPU's view of where in the memory address space the devices attached to the MC1 and MC2 buses are located.

Model 4: 4GB Memory Address, 4GB I/O Address Space

The PCI specification supports a 32 bit, 4GB I/O address space. PCI devices are required to decode all 32 bits of the address bus for I/O bus commands. The Intel x86 processors do not, however, emit 32 bit I/O addresses.

The 4GB I/O address space may be used in the subset mode, utilizing only the first 64K of the I/O address space as described above under the caption "4GB Memory Address Space, 64K I/O Address Space." Merged 64K I/O addresses, as described in "4GB Memory Address Space, Single 64K I/O Space, Multiple Buses" are also supported. PCI devices must be mapped into this 64K address space or mapped into the memory address space.

When used as a 4GB I/O address space, the I/O addresses may be emitted from the system master (e.g., processor 12 of FIG. 1) as: (1) 32 bit memory addresses; and (2) 16 bit I/O addresses.

The 32 bit memory address mode is described above under the caption: "4GB Address Space Containing Memory and I/O". This mode is used in systems with processors that do not emit I/O signals. A region of the system memory address space is allocated for I/O addresses. Memory addresses emitted by the processor which are destined for I/O slaves must have the memory signal translated to an I/O signal. The incoming memory address may be translated to a different value before output. This is accomplished with address range check and translation registers in the host-to-bus bridge.

PCI bridges must identify which I/O address ranges are used by devices or buses attached to their bridge. All devices and expansion bus bridges must be programmed with addresses within a range (usually sequential). No other bridge within the system may have addresses within the same range. Expansion bus bridges must also identify which I/O addresses are below the bridge.

Figure 8:
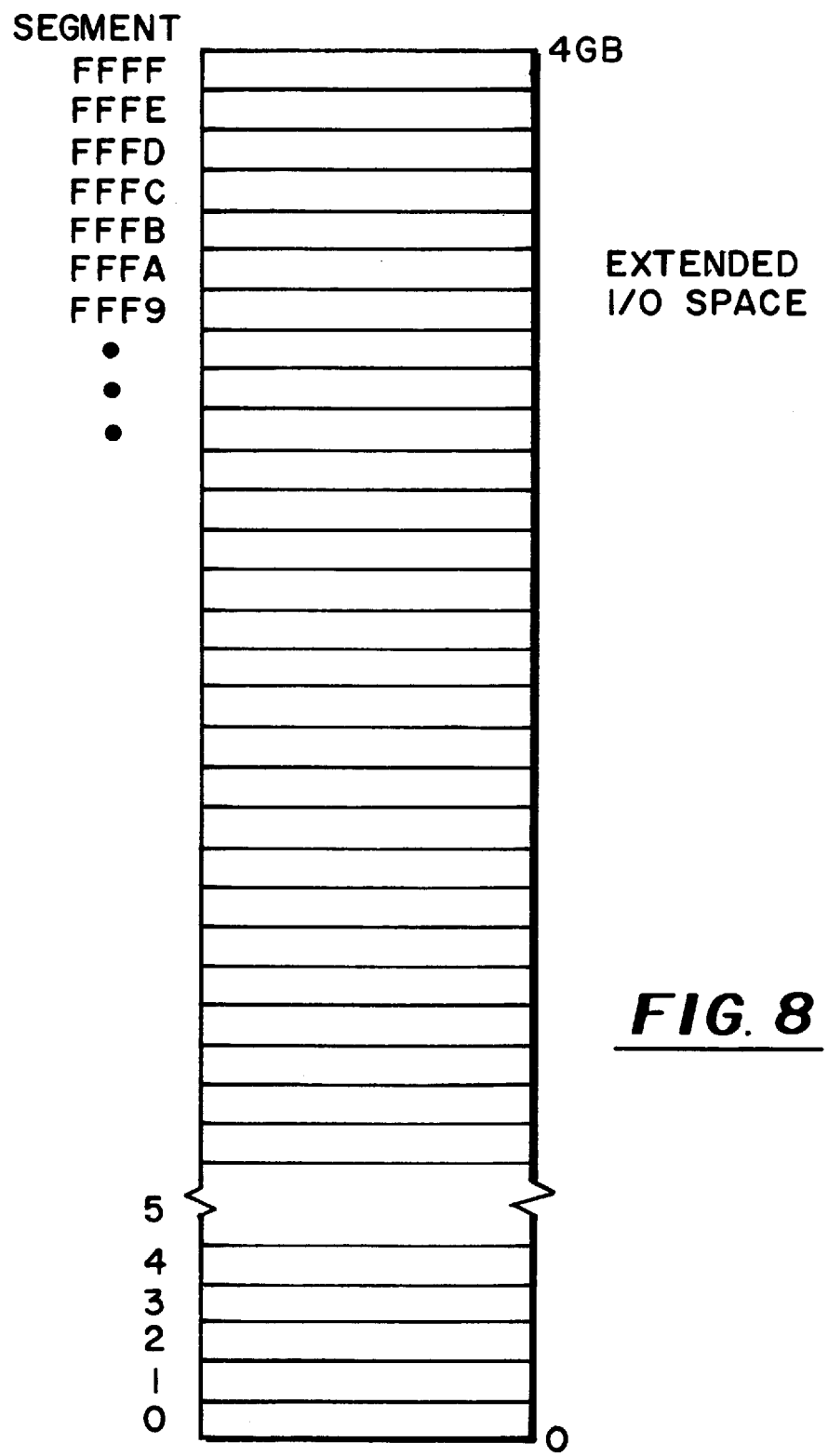
FIG. 8 shows a 4GB segmented I/O address space.

In the 4GB I/O address mode, one way of implementing a segmented I/O address map would be to consider the I/O address space to be divided into 64K segments of I/O address space, each 64K long as illustrated in FIG. 8. In this mode, the processor emits a 16 bit I/O address with an I/O signal. An external I/O segment register is appended to the high order address bits of the address bus and the resulting 32 bit address is presented to the host-to-PCI bus bridge. Each PCI bus in the hierarchy is assigned a segment number and all devices on that bus have addresses with the high 16 bits equal to the segment value. Each Micro Channel expansion bus is assigned a segment value which is used to identify I/O addresses destined for devices on that bus. This addressing mode allows full protection of I/O addresses in Intel x86 based systems by controlling the setting of the segment register at ring 0 and using bit map permission to restrict device drivers in user space from accessing I/O resources they do not control.

A subset of this architecture allows an 8-bit implementation using the high order 8 bits of the address bus. This model of the I/O address space contains 256 64K I/O address segments which may be allocated to expansion buses. Using the high order address bus bits permits a wider distribution of the I/O addresses which may be necessary if the expansion buses are attached to different PCI buses.

ADDRESS SPACE DOMAINS

Applying the requirements and constraints to the address reference model implies that multiple entities in a system must be assigned the same physical address. Assigning the same address to two physical entities creates unacceptable electrical conflicts. To resolve these conflicts, these entities are placed in separate address domains and address translation mechanisms must be provided at the domain boundaries. Specifically, address translations are provided at the bridges and the memory controller. This results in two views of the system address space: (1) The system master view; and (2) The bus master view.

The system master sees the address space before any translations are applied, typically with system memory starting at memory address 0. This is described in more detail in "System Master View of Address Space."

Bus masters see the address space after the translations are applied. It is possible for the bus master view of the memory address of the start of system memory to be a value other than 0.

Referring to FIG. 9, the system of FIG. 1 is modified (and simplified) to illustrate these two views of the address space. Note that system memory has the same relationship to the system master as I/O or non-system memory. This is a logical view of the structure and does not represent the electrical or bus structure.

The system master views the address space from above the host-to-bus bridge prior to any address translation. Typically, the system master sees system memory starting at address 0. The system memory may be contiguous or may contain compatibility holes. Non-system memory on one or more of the buses may be mapped into these holes. Memory space above the end of system memory may be occupied by memory mapped or I/O mapped I/O slaves.

The bus master view of the address space is shown in FIG. 9 under the dotted line. Translations may be applied at each bridge in the system. The following describes the address space map from the viewpoint of a bus master residing on any of the attached buses. This view considers the bus master as it addresses non-system memory or I/O slaves in using the different addressing models. There are two types of addressing transactions: (1) transactions between masters and slaves on the same bus only; (2) transactions between masters and slaves on different buses. In addition, transactions between masters on any bus and system memory must always be allowed.

A bus master addressing a slave on the same bus (Micro Channel or PCI) must emit an address to which the slave will respond and which the bridge will recognize belongs on the bus. The bridge above the master must recognize that an address emitted by a master is local to the bus and does not require negotiating for the bus above the bridge.

Bus masters on one expansion bus may emit addresses that are associated with devices on a different expansion bus. These addresses may be one of the following: 32 bit memory addresses; 24 bit memory addresses; or 16 bit I/O addresses.

There are constraints associated with the 24 bit memory addresses and the 16-bit I/O addresses. In systems with multiple expansion buses and a single shared memory region 2, the expansion bus bridge must use the address range filter registers to detect if the address is local to the bus or remote (on another expansion bus). If the address is on another expansion bus, the bridge must gain control of the above bus and emit the address and appropriate signal upward.

Likewise, 32-bit memory addresses emitted by bus masters require the expansion bus bridge use the address range filters to determine if the address is below the bus or above the bus.

ARCHITECTURE OF ADDRESS SPACES

This section describes the architecture of memory address spaces and I/O address spaces. The requirements are defined for: (1) Host-to-PCI bus bridges; (2) Micro Channel, ISA and EISA bus bridges; and (3) PCI-to-PCI Bus bridges.

An architecture in accordance with the invention could allow the 32-bit memory address space of Intel x86 and RISC processors to be mapped in one of two ways: (1) with Intel 20, 24 bit address range holes (see 3 region model of FIG. 4); or (2) with all system memory contiguous. The 32-bit memory address space contains two types of memory: (1) memory in the processor memory address space for operating system and application software and data (called system memory in the PC architecture); (2) Memory in the processor memory address space used by I/O devices (called non-system memory in the PC architecture).

There are two types of processors to consider, processors with and without I/O address space. These processors can emit some or all of the following: (1) 32 bit addresses; (2) 24 bit addresses; (3) 16 bit addresses; and (4) M/IO signal.

Memory addresses emitted by a system master and used by I/O slaves may be either memory mapped I/O devices or I/O mapped I/O devices. I/O addresses that are mapped into memory addresses are always mapped into non-system memory. When a memory address is emitted from an Intel x86 processor the memory/IO signal is in the memory state. All system memory addresses must be present in the memory address space at all times. Defective memory may be mapped out via page management mechanisms, however, defective memory is not considered non-system memory.

Memory addresses may be translated at certain interfaces (bus bridges). Therefore, a specific location of physical memory may appear to have different addresses as viewed by the system master and a master on a bus.

An architecture in accordance with the invention, could allow the I/O address space to be mapped in the following modes: (1) one 64K I/O address space; (2) a 4GB I/O address space which may be segmented into 64K segments; or (3) I/O addresses mapped into the memory address space. Each of these options is necessary to support one or more of the hardware configurations. Processors which do not support I/O addresses and the I/O signal require all I/O to be mapped in memory.

An I/O address emitted by an Intel x86 processor is a 16 bit address with the Memory/IO signal in the IO state. Special instructions, IN and OUT are used in the Intel x86 processor to cause the I/O signal to be active. RISC processors typically do not emit I/O addresses or the I/O signal.

Existing I/O devices on adapters (both Micro Channel and ISA) decode I/O addresses in the 64K I/O address range and ignore the high order address bits above A15. These adapters typically have a limited set of I/O address selections. The number of I/O address selections an adapter supports is usually determined by the number of adapters expected to be installed in a system with a single expansion bus.

The PCI specification defines I/O cycles on the PCI bus with an I/O command and with a 32 bit address. PCI devices are required to decode all 32 bits of an I/O address. The I/O address space is shared by multiple devices, each using a relatively small number of I/O addresses (i.e. 1 to 32 addresses) which may not be contiguous. An architecture in accordance with the invention would not restrict the number of I/O addresses a device may use. The Micro Channel architecture allows adapters to consume larger amounts of I/O addresses if the I/O addresses are fully programmable.

Referring again to FIG. 1, the memory controller/host-to-bus bridge 18 performs an address range check on all memory addresses emitted by the processor(s) 12. The address is then routed either to the system memory 14 or to the bus 19. Memory addresses which are routed to the bus 19 may be emitted to the bus 19 as either bus memory cycles or bus I/O cycles. A translate output signal indicator is used to determine which type of cycle is emitted. All I/O addresses emitted by the processor 12 are routed to the bus 19 (except those I/O addresses used by the memory controller/host-to-bus bridge).

The address translation functions include: (1) Mapping a range of the input addresses to an output range; (2) Changing a range of input addresses from one type to another (i.e. memory to I/O or I/O to memory); (3) Expanding an address range (mapping 32 bytes to 4K bytes). In systems that require support for more than 64K of I/O address space, the processor complex must contain segment registers for the high order n bits of address to be emitted to the bus. There must be one segment register for each processor in the system master processor set. The segment registers must be memory mapped in a 4KB address region that does not contain any device I/O or processor critical functions to allow the processor access to the register at all times. These registers will contain n bits of addressing information which will be added to the 16 bit I/O address emitted by the system master. These segment register may be programmed to direct the I/O operation to the appropriate expansion bus or PCI device. In addition, to the address translate, the output signal may be translated from a Memory or I/O to an I/O or Memory signal.

ADDRESS SPACE ARCHITECTURE INTERFACES

Figure 10B:
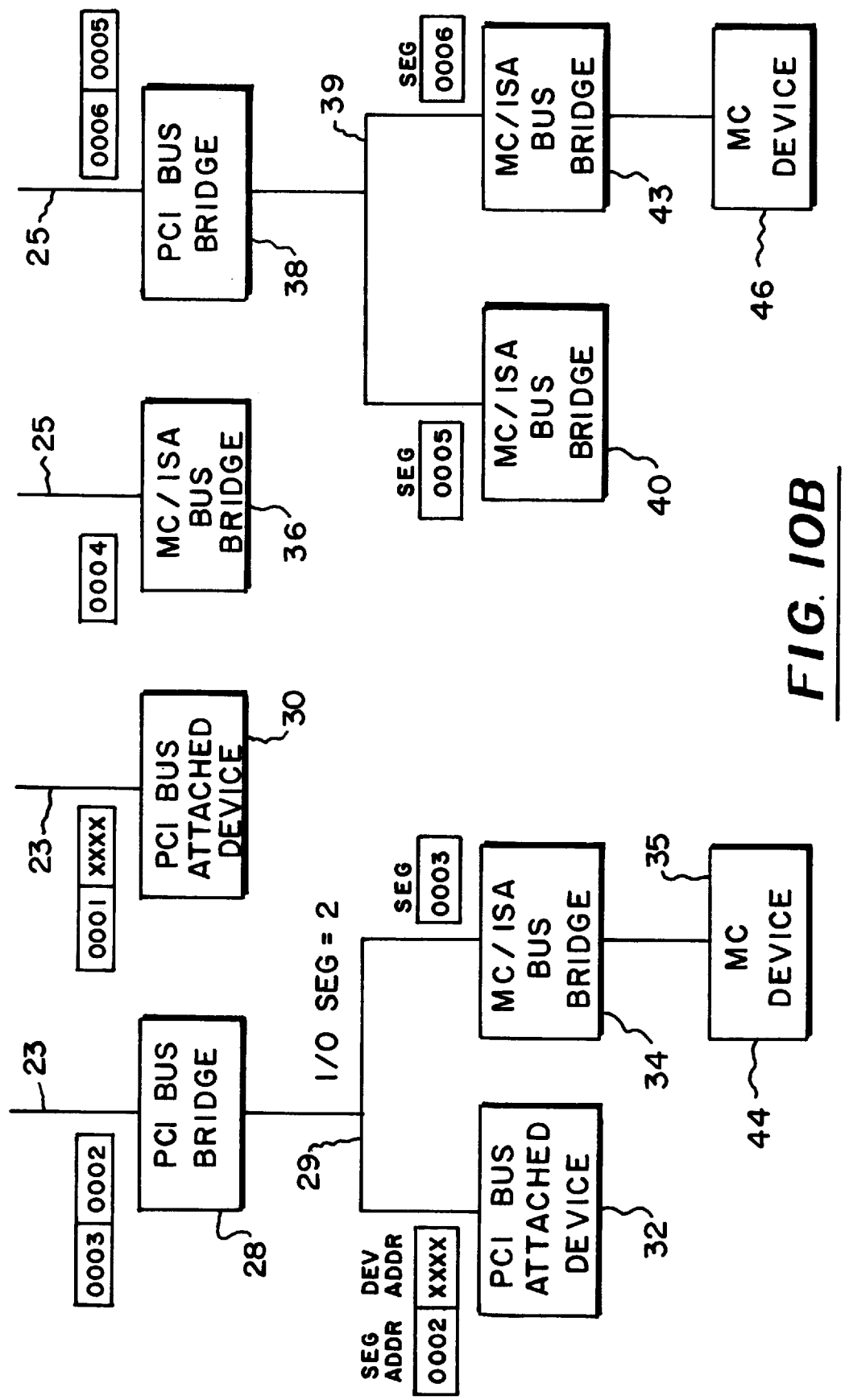
FIG. 10 shows a modification of FIG. 1 to include segment and bus bridge registers.

The invention allows implementations that are compatible with both Intel x86 and RISC processor architectures. The embodiment previously discussed with reference to FIG. 1 included a processor that does not emit I/O signals. Referring now to FIG. 10, the system of FIG. 1 has been modified to include segment registers 13 associated with the system processor(s). In this embodiment the processor(s) 12 are of the type that emit 16 bit I/O signals and a M/IO signal indicating that this is an I/O address (i.e., processors of the Intel x86 type). Intel x86 processors support only 16 bits of I/O address space. To extend this I/O memory space to 32 bits, an external segment register 13 is used for each processor 12. The segment register 13 contains the high order 16 bits of a 32-bit address. When the processor 12 issues an I/O command (signalled by the M/IO output being in the I/O state), the segment register is strobed onto the high order bits of the address bus.

Figures 11, 12:
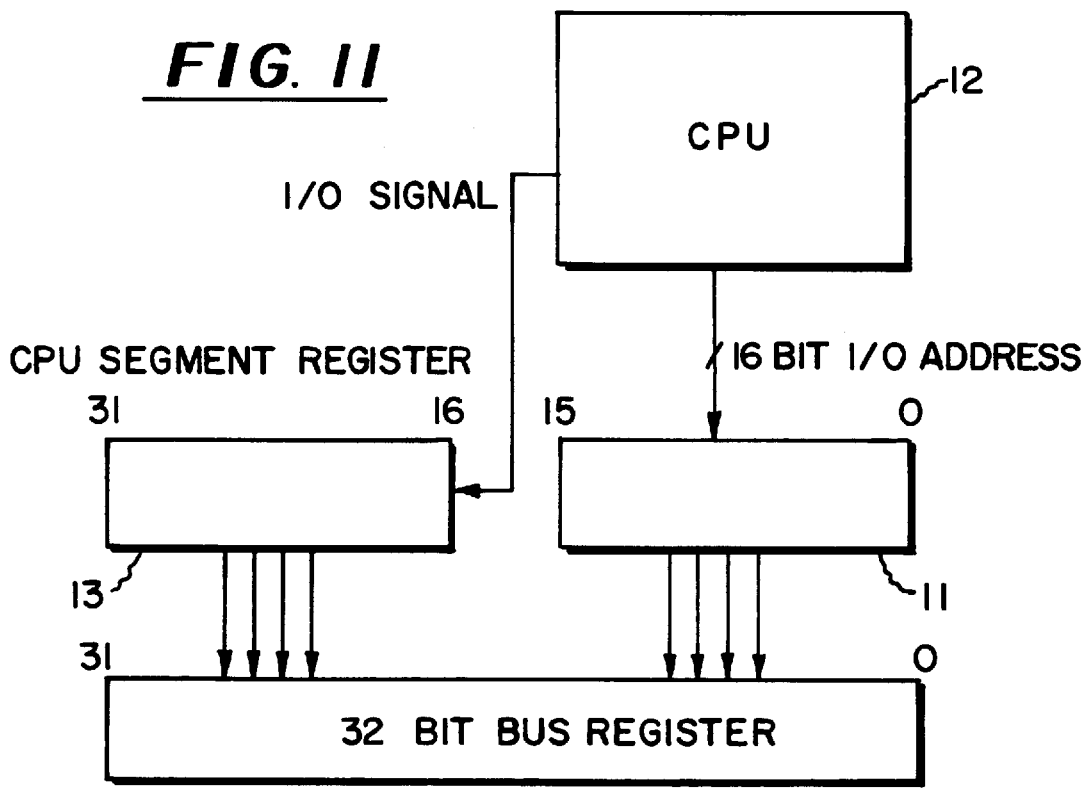
FIG. 11 shows extending the CPU 16 bit I/O addresses to 32 bits in accordance with an aspect of the invention.
FIG. 12 shows an address filtering and translation variable data field.

Referring to FIG. 11, an I/O segment register is shown for appending bits 16–31 to the low order 16 bits (11) emitted by the CPU 12. Thus, a 32-bit address signal is provided to the address component of the processor bus 16.

The architecture interfaces include: bus bridge interfaces and processor/central electronics complex (CEC) interfaces. The CEC is the circuitry generally connected to the CPU. Processor/CEC subsystems must contain I/O segment registers to augment the I/O address output of Intel x86 processors when used in a multiple bus environment where more than 16 bits are required for I/O addresses.

Referring to FIG. 12, bus bridges must contain n sets of programmable functions as follows: (1) Enable; (2) Input Signal; (3) Start Address; (4) End Address; (5) Output Signal; (6) Address translate; (7) Route; and (8) I/O Segment Registers. Address inputs of the designated Input Signal type (M/IO) are range-checked to be within the Start and End Address. If the input address is within the specified range and the input signal is the type specified, the output address and output signal are emitted to the bus below. Each set of address filters may be enabled separately.

Before output, the address may be translated by the address translate field. The address translate function may be enabled or disabled. In the general case, the address translation field is an n-bit wide field that represents a binary value used to translate an incoming address to an output address. Allowable address translate functions include: (1) Adder; (2) Exclusive OR; or (3) Stripping.

The adder translation function consists of a register containing an unsigned integer to be added to the upper n-bits of the input address. Overflow from this addition is discarded. This allows wrap around of the address space so that an address range can be mapped into a lower address range. The address translate may be used to convert a 16 bit or 24 bit address to a 32 bit address. The address translation may also be used to covert a 32 bit address to a 16 bit or 24 bit address. This translate function is described in FIG. 10 on page 18. The exclusive OR translate function consists of a register containing n bits of binary information to be exclusive ORed with the high order n bits of the input address.

The stripping function consists of a register which identifies the number of high order bits of the 32 bit address are discarded (or stripped) from the address before the address is forwarded to the bus. For the host-to-bus bridge, the address is routed as directed by the Route indicator (either to the system memory or to the bus).

Therefore, the invention provides an apparatus for defining address space for information processing systems with one or more expansion buses and one or more processors. Thus, a hierarchical bus structure is supported wherein different buses are in compliance with different bus protocols. Thus, the invention allows common bus bridges for Intel x86 and RISC based computer systems, and supports a broad range of system designs.

What is claimed is:

1. An information processing system comprising:
 a processor including means for emitting address signals directed to a selected peripheral device;
 a first bus coupled to said processor for conducting address signals in accordance with a first bus address protocol that supports n-bit address signals for selecting a peripheral device;
 a second bus for conducting address signals in accordance with a second bus address protocol that supports m-bit input/output (I/O) address signals for selecting the peripheral device; and a bridge circuit for coupling the first bus to the second bus, the bridge circuit comprising:
   a filter for determining whether the address signal emitted by the processor corresponds to a peripheral device coupled to a bus subordinate to the bridge circuit; and
   a decoder, coupled to the filter, for converting the n-bit address signals in accordance with the first bus address protocol to m-bit address signals in accordance with the second bus address protocol for transmission to the selected peripheral device.

2. The information processing system of claim 1, wherein the first bus supports n-bit address signals for selecting a peripheral device and the second bus supports m-bit I/O address signals for selecting the peripheral device, and wherein n is greater than m.

3. The information processing system of claim 1, wherein the first bus supports n-bit address signals for selecting a peripheral device and the second bus supports m-bit I/O address signals for selecting the peripheral device, and wherein n is less than m.

4. The information processing system of claim 1, wherein the first bus supports n-bit address signals for selecting a peripheral device and the second bus supports m-bit address signals for selecting the peripheral device, and wherein n is equal to m.

5. The information processing system of claim 1, wherein the decoder comprises an adder for adding a predetermined value to an input address to produce an output address for transmission to the selected peripheral device.

6. The information processing system of claim 1, wherein the decoder comprises an exclusive OR device for performing an OR function on a predetermined value and an input address to produce an output address for transmission to the selected peripheral device.

7. The information processing system of claim 1, wherein the decoder comprises a stripping circuit for removing a predetermined number of high order bit from an input address to produce an output address for transmission to the selected peripheral device.

8. The information processing system of claim 1, wherein the second bus is an I/O bus.

9. The information processing system of claim 1, wherein the first bus is directly coupled to the processor.

10. The information processing system of claim 1, wherein the filter comprises multiple address range register sets, each register set comprising a start and end value, an input signal type, an output signal type.

11. The information processing system of claim 6, wherein the first bus is a host bus directly coupled to the processor.

12. The information processing system of claim 1, wherein said processor is only operative to emit an n-bit memory address corresponding to a memory cycle, said filter is operative to determine whether the n-bit memory address signal emitted by the processor corresponds to said peripheral device and said decoder is operative to convert the memory cycle to an I/O cycle when said filter determines that the n-bit memory address signal emitted by the processor corresponds to said peripheral device.

13. The information processing system of claim 1, wherein said first bus is a peripheral component interconnect (PCI) bus and said second bus is a Micro Channel bus.

14. The information processing system of claim 1, wherein said processor can further emit an address type signal indicating whether the corresponding address is a memory address or an I/O address directed to the selected peripheral device.

15. The information processing system of claim 14, further including a segment register coupled to said processor for storing o-bits of an I/O address, said processor is operative to emit memory addresses comprised of n-bits and I/O addresses comprised of p-bits, wherein o plus p is equal to n and wherein when said processor emits a p-bit I/O address and said address type signal directed to the peripheral device, said o-bits are strobed onto said first bus resulting in an I/O address of n-bits.

16. The information processing system of claim 14, wherein said processor is operative to emit 32 bit memory addresses and a corresponding memory address type signal, and emit 16 bit I/O addresses and a corresponding I/O address type signal, said decoder being operative to convert said 16 bit I/O addresses in accordance with the first bus protocol to 32 bit I/O addresses in accordance with the second bus protocol.

17. The information processing system of claim 1, further including:
   a bus master device coupled to said second bus and operative to emit address signals directed to a second selected peripheral device,
   a third bus for conducting address signals in accordance with a third bus address protocol that supports q-bit address signals for selecting said second peripheral device; and
   a second bridge circuit for coupling the second bus to the third bus, the second bridge circuit comprising:
      a second filter for determining whether the address signal emitted by the second bus master corresponds to said second peripheral device coupled to a bus subordinate to the second bridge circuit; and
      a second decoder coupled to the second filter for converting the m-bit address signals in accordance with the second bus address protocol to q-bit address signals in accordance with the third bus address protocol for transmission to the second selected peripheral device.

18. The information processing system of claim 17, wherein said first is a host bus directly coupled to the processor, said second bus is a peripheral component interconnect (PCI) bus and said third bus is a Micro Channel bus.

* * * * *